(12) United States Patent
DeWaard

(10) Patent No.: US 6,637,375 B2
(45) Date of Patent: Oct. 28, 2003

(54) COW INDEXING AND POSITIONING METHOD AND APPARATUS

(76) Inventor: Dave DeWaard, 8540 Benson, Lynden, WA (US) 98264

(*) Notice: Subject to any disclaimer, the term of this patent is extended or adjusted under 35 U.S.C. 154(b) by 0 days.

(21) Appl. No.: 09/876,643

(22) Filed: Jun. 6, 2001

(65) Prior Publication Data

US 2001/0047765 A1 Dec. 6, 2001

Related U.S. Application Data

(60) Provisional application No. 60/209,741, filed on Jun. 6, 2000.

(51) Int. Cl.[7] .................................................. A01K 1/12
(52) U.S. Cl. ...................... 119/520; 119/14.03; 119/517; 119/739
(58) Field of Search .............................. 119/14.03, 520, 119/739, 517

(56) References Cited

U.S. PATENT DOCUMENTS

| | | | |
|---|---|---|---|
| 4,183,326 A | * 1/1980 | Wills | 119/712 |
| 4,194,467 A | 3/1980 | Nielsen et al. | |
| 4,419,961 A | * 12/1983 | Vandenberg et al. | 119/14.03 |
| 4,951,608 A | 8/1990 | Reisgies et al. | |
| 5,230,299 A | * 7/1993 | Moreau | 119/14.03 |
| 5,259,334 A | 11/1993 | Peacock | |
| 5,285,746 A | * 2/1994 | Moreau | 119/14.03 |
| 5,373,813 A | * 12/1994 | De Silveira | 119/740 |
| 5,392,731 A | * 2/1995 | Hoppman et al. | 119/14.03 |
| 5,638,768 A | 6/1997 | Moreau | |
| 6,216,633 B1 | * 4/2001 | Gallagher et al. | 119/14.03 |
| 6,279,507 B1 | * 8/2001 | van der Lely et al. | 119/14.01 |

* cited by examiner

*Primary Examiner*—Charles T. Jordan
*Assistant Examiner*—Tara M Golba
(74) *Attorney, Agent, or Firm*—Robert B. Hughes; Hughes Law Firm, PLLC

(57) ABSTRACT

A cow indexing and positioning system comprising a first and second actuating systems where the first actuating system repositions a cow brisket bar assembly in the horizontal plane to index the cows located in a stall to be milked. When the cows are finished being milked the first actuating system then disengages from the cows' briskets and the second actuating system vertically raises the cow brisket bar assembly to allow the cows to pass thereunder.

13 Claims, 5 Drawing Sheets

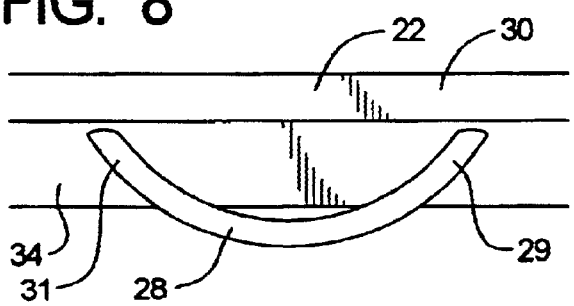
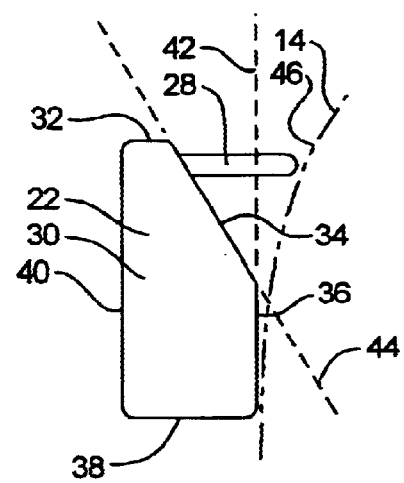
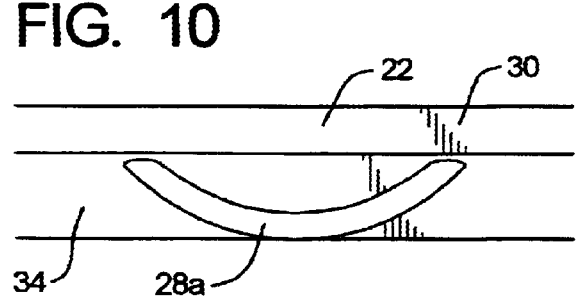
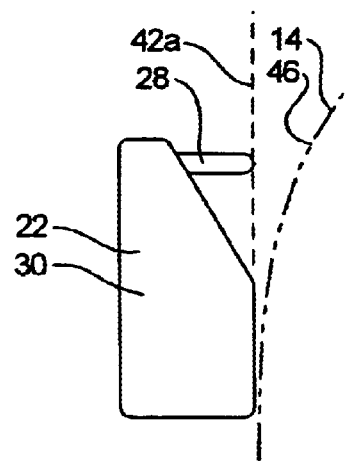

COW INDEXING AND POSITIONING METHOD AND APPARATUS

RELATED APPLICATIONS

This application claims priority of U.S. Provisional Application Ser. No. 60/209,741, which was filed Jun. 6, 2000.

FIELD OF THE INVENTION

The invention relates to cow indexing and positioning systems for herringbone stalls. The present invention is adapted to be retrofitted to existing stalls and provide indexing and positioning of cows and further provided an exit procedure.

BACKGROUND

Traditional milking parlors have indexing systems that properly position a cow into a milking position. When the cows are in a proper alignment in the parlor area they are indexed. Thereafter, they must be repositioned to a milking position where their hindquarters are in proximity to the milking equipment. In general, the indexing process requires a brisket engaging surface to engage the brisket of a cow and move her rearwardly. When the milking process is completed the cows must exit the milking parlor. A preferred form of having the cows exit is to raise the brisket bar and allow the cows to pass underneath. Therefore, the goals the present invention is to provide an indexing and positioning system that is tightly integrated with an exit process. The present invention is particularly advantageous allowing two degrees of motion about at least two substantially vertical members. The first degree of motion allows rotation in the substantial horizontal plane where the brisket bar is a portion of a four bar linkage and is repositioned in the substantial horizontal plane. The two substantially vertical members further allow the second degree of motion where the position and control system displaces vertically about the two substantially vertical members. This action raises the brisket bar allowing the cows to pass thereunder.

The present invention is particularly advantageous because a substantial amount of the motion is conducted about the two substantially vertical members. Further, the position and control system comprises first and second members that in conjunction with the brisket bar comprise the four bar linkage. The four bar linkage assembly provides a desirable positioning motion that is psychologically conducive to the cows and the brisket bar engages their brisket region and repositions them rearwardly. Therefore, the brisket bar does not rise vertically to engage the brisket of the cow or swing from a laterally extending axis. Such motions can frighten and psychologically disturb a young cow. Further, the present invention allows the brisket bar tube disengaged from the brisket of the cow prior to be repositioned vertically to allow the cows to exit. This gives clearance for the cow to reposition her head from being positioned vertically above the brisket bar. The invention is particularly advantageous with a particular brisket bar having rounded extension members.

Therefore, having at least two substantially vertical poles allowing the two degrees of motion (i.e. rotation of the first and second members about a vertical axis and vertical displacement of the first and second members) allows the dairy farmer easier maintenance of the milking system because there is only one set of vertical poles to maintain and keep lubricated.

The prior art discloses different ways to position a cow further, other forms of prior art discloses methods of repositioning a brisket bar to allow cows to pass thereunder. However, the prior art fails to show the combined elements disclosed herein which provides a new and useful method of indexing and positioning a cow along with an integrated exit system.

BACKGROUND ART

A search of the patent literature has a number of patents directed toward these problems, these being the following:

U.S. Pat. No. 5,638,768 (Moreau) shows a cow positioning means which a five sided rail 28 is used. The slanted surface 40, bears against the brisket of the animal to position it. There are additional positioning means 30, secured to bar 28 that also position the cow.

FIG. 2 shows a perspective view of the system where the swing-up front rail assembly rotates about pivot bar 26 when cylinder 36 is actuated.

This patent discloses a brisket bar that lifts and has an oblique surface; however, the positioning tubing is not disclosed.

U.S. Pat. No. 5,259,334 (Peacock) shows a barrier element 68 that serves as the brisket engaging element in a herringbone type stall system. The barrier is raised by a winch system using cable 62, to release the cattle. Apparently the brisket barrier 14 does not move horizontally; it only lifts vertically.

U.S. Pat. No. 4,951,608 (Reisgies et al.) shows brisket bar that controls the position and movement of cows in a milking parlor. As seen in FIG. 4, the cylinder 31 swings channel 24 about pivot 30 so the brisket bar engages the cows' brisket. FIGS. 2 and 3 show the brisket bar in down and up positions respectively.

U.S. Pat. No. 4,194,467 (Nielsen et al.) shows a herringbone milking stall system where the cows enter at points 45. As seen in FIG. 4, the brisket bar 24 can position the cow by the rotation of link 27 about bearing 41. The brisket bar does not lift vertically.

SUMMARY OF THE INVENTION

The invention is a cow indexing and positioning system that is adapted to reposition a cow by engaging the brisket portion. The system is adapted to operate in a parlor having first and second substantially vertical extending poles that are rigidly attached therein. The system comprises an elongate bar that extends in a longitudinal direction. A first actuating system that has a first member, a second member, and a first actuator. The first member has a cylindrical portion and an extension portion rigidly attached thereto and the extension portion is pivotally mounted to the elongate bar. The second member has a second cylindrical portion and an extension portion that is rigidly attached thereto and the extension portion is also pivotally mounted to the elongate bar. The actuator is pivotally mounted to the elongate bar and further pivotally mounted to the cylindrical portion of the first member in a manner so the actuator can rotate the cylindrical member. The indexing and positioning system further comprises a second actuating system having a second actuator that is adapted to raise the elongate bar where the first and second cylindrical portions are adapted to slide vertically upon the first and second substantially vertical poles.

The elongate bar has a substantially vertically extending surface, an oblique surface, and a plurality of rounded extension members. The rounded extension members are adapted to extend latterly inwardly. In one embodiment the rounded extensions do not extend beyond the substantially vertical plane defined by the substantially vertically extending surface. In a second embodiment the rounded extension members do not extend latterly inwardly past a cow body which is defined as the mean cross-sectional outer layer of a cow (or number of cows).

BRIEF DESCRIPTION OF THE DRAWINGS

FIG. 8 is a top view of a portion of the elongate bar showing a rounded extension;

FIG. 9 is a horizontal view along the longitudinal axis showing a partial view of the mean (average) body surface of a cow in the broken line 46;

FIG. 10 is a second embodiment of any elongate bar where the rounded extensions do not extend beyond the vertical plane defined by the vertical surface; and FIG. 11 is a horizontal view along the longitudinal axis of the second embodiment of the elongate member showing a partial view of the mean body surface of a cow in the broken line 46.

DETAILED DESCRIPTION OF THE PREFERRED EMBODIMENT

Figure 1:
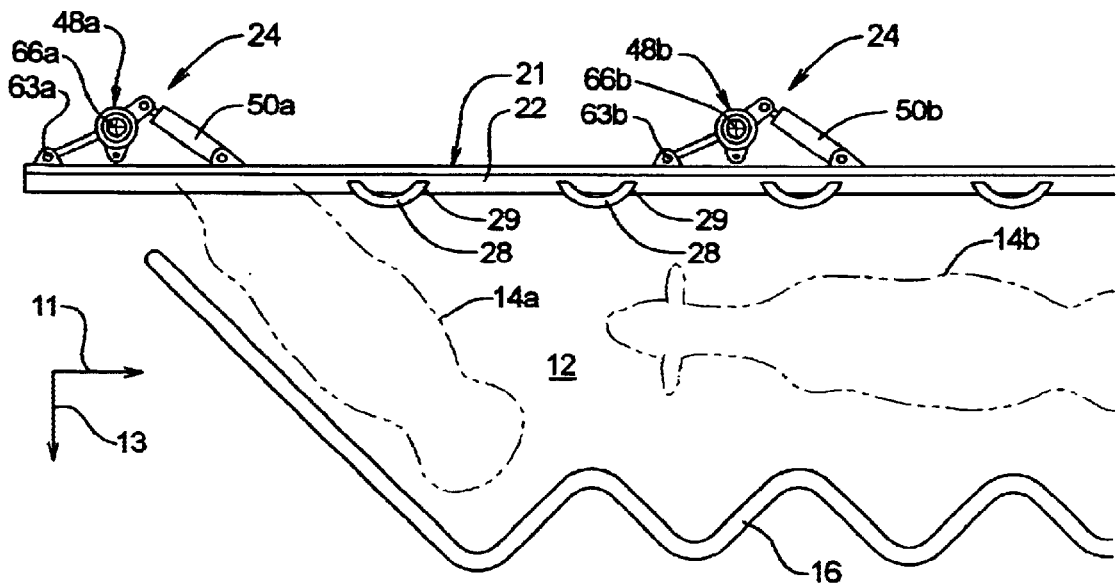
FIG. 1 is a plan view of the apparatus with the brisket bar assembly in a disengaged positioned.
Figure 2:
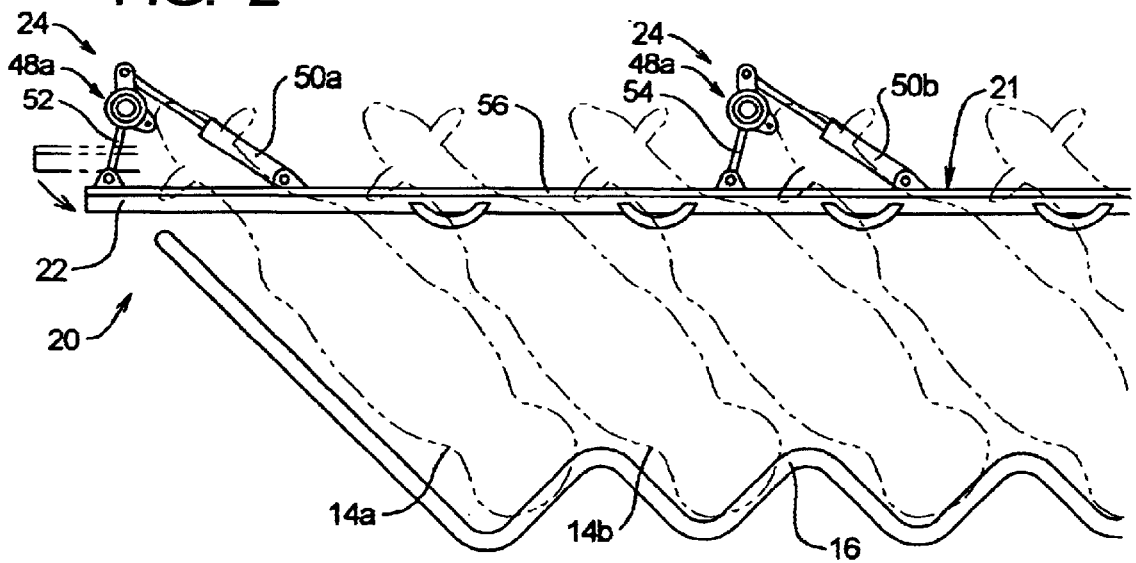
FIG. 2 is a plan view with a group of cows in a milking position with the brisket bar assembly in an engaged position.

The apparatus of the present invention is designed to be implemented in a milking parlor that has a stall portion 12 and a jagged bar assembly 16. As seen in FIGS. 1 and 2, the cows 14 travel into the stall 12 from the rightward portion of the milking parlor and align themselves into an oblique configuration as seen in FIG. 2.

For ease of explanation and not intended to limit the scope of the invention in any manner, an axis system is defined where as seen in FIG. 1 the axis 11 defines a longitudinal axis where the arrow indicates a downward direction. The axis 13 defines a lateral direction where the arrow of axis 13 indicates a rearward direction. Likewise, the axis orthogonal to axis 11 and 13 defines a vertical axis.

As seen in FIG. 2, the cow indexing and positioning system 20 comprises a brisket bar assembly 21 and a second actuating system 26. The brisket bar assembly 21 comprises a substantially horizontal bar member 22 and a first actuating system 24.

As seen in FIGS. 8–11, the bar member 22 comprises a plurality of rounded extensions 28 and a longitudinally extending bar 30. The bar 30 has an upper surface 32 an oblique surface 34, a substantially vertical surface 36, a lower surface 38 and a rearward surface 40. As seen in FIG. 9 the substantially vertical surface 36 defines a substantially vertical plane 42. Likewise, the oblique surface 34 defines a brisket engagement plane 44. The curved broken line 46 roughly defines the mean cross-sectional outer layer of a cow herein referred to as the cow body.

As seen in FIG. 9, the rounded extensions 28 extend laterally beyond the substantially vertical plane 42 but does not extend beyond the cow body 46 (or mean cow body plane 46). The benefits of this will be discussed further herein. The rounded extensions have an inner surface 29 and an outer surface 31.

FIGS. 10 and 11 show a second embodiment where the rounded extensions 28a do not extend beyond the substantially vertical plane 42a. As seen in FIGS. 8–9, the rounded extension 28a does not extend into the cow body 46a (or mean cow body plane 46a). This embodiment is particularly advantageous when the cow body 46a is substantially vertical as it would be with large cows with a very large abdomen where the bar member 22 is positioned in the central to lower portion of the cows' abdomen.

In general, the first actuating system 24 of the brisket bar assembly 21 has two positions, a disengaged positioned as seen in FIG. 1 and an engaged position as seen in FIG. 2. When the first actuating system 24 is in an engaged position the brisket engaging surface 34 of the horizontal bar member 22 is in contact with the brisket of the cow when the cow is in a milking position as seen in FIG. 2. When the first actuating system places the horizontal bar member 22 in a disengaged positioned, the brisket engaging surface 34 of the horizontal bar member 22 is spaced apart from the brisket of the cow. The separation is sufficient so the cows can reposition their heads to avoid contact with the horizontal bar member 22 when it raises vertically via the second actuating system discussed further herein.

The first actuating system 24 is best seen in FIGS. 1–4, and comprises a position control system 48 and an actuator 50. As seen in FIGS. 1 and 2, the position control systems 48a and 48b and the actuators 50a and 50b are substantially similar and hence will both be described in FIGS. 3–5.

As seen in FIGS. 1–4, the position control system 48 comprises a first member 52, a second member 54, and a longitudinally extending portion 56 that is a portion of member 30 in the preferred embodiment. The first member 52 is substantially similar to the second member 54 hence, the first member 52 will be discussed with reference to FIGS. 3 and 4 with the understanding the description is relevant to the second member 54.

Figure 3:
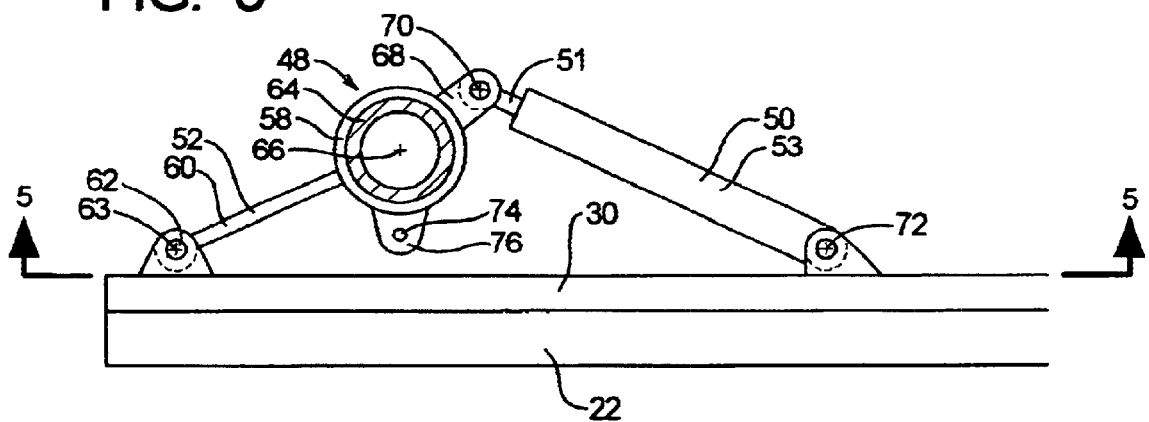
FIG. 3 is a partial horizontal cross-sectional view of the first actuating system and the position control system where the brisket bar is in a disengaged positioned.

As seen in FIG. 3, the first member 52 comprises a cylindrical section 58 and an arm portion 60 that is rigidly attached thereto. The arm portion 60 has a pivot connection to the elongate bar member 22 at point 62 where the centerpoint of rotation is designated at 63. In an alternate embodiment the arm portion 60 can have an actuator that telescopically or otherwise extends to further index the cow. With more than two members 52 and 54 the amount of extension of the members must be equal and executed simultaneously. The cylindrical section 58 is housed around a rigid cylindrical pole 64 that is attached at its lower portion and upper portion of the barn or surrounding structure. The centerpoint of rotation for the cylindrical section 58 is designated at point 66.

As seen in FIGS. 1 and 2, the linkages 52, 54 and 30 operate as a four bar linkage where the elongate bar member 22 transversely repositions in the horizontal plane and does not rotate. The motion of the elongate bar 22 is a repositioning in the lateral and longitudinally directions. The ramifications of this motion of the elongate bar 22 will be further discussed herein when we discussed the psychology of the cow and the general milking operation.

It should be noted that in the preferred embodiment the centerpoints 66a and 63a are substantially aligned in the lateral direction with the points 66b and 63b (see FIGS. 1 and 2). Further, the distances between 66a and 66b are the same as the distance between 63a and 63b. Likewise, the distance between 66a and 63a is substantially the same as the distance between 66b and 66b.

Figure 4:
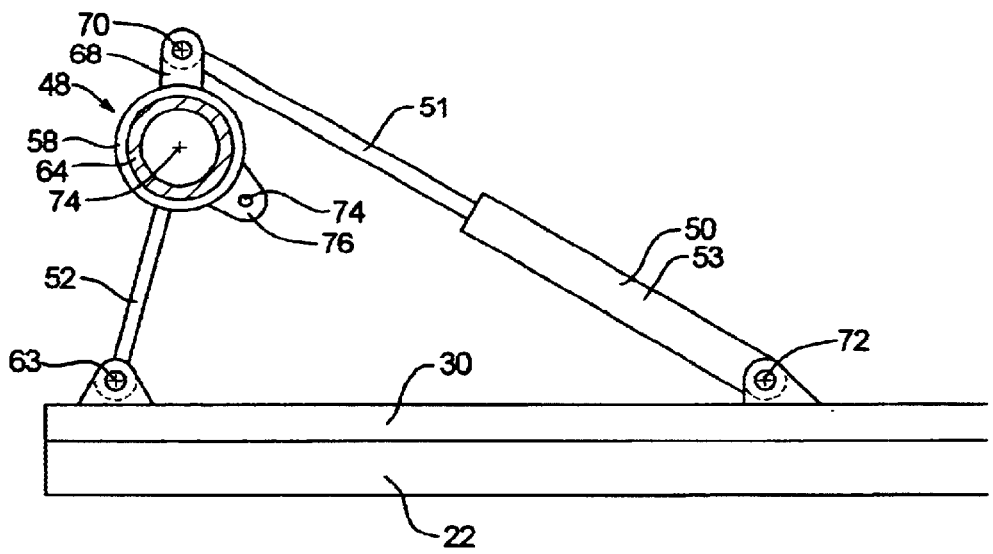
FIG. 4 is a partial horizontal cross-sectional view of the first actuating system and the position control system where the brisket bar is in an engaged position.

As seen in FIGS. 3 and 4, the actuator 50 comprises an extension rod 51 and housing 53. The extension rod 51 is pivotally attached to the extension 68 that is rigidly attached to the cylindrical tube 58. The centerpoint 70 is at a perpendicular distance to the centerpoint 66 with respect to the longitudinal axis of the actuator 50 so a moment can be generated about the cylinder 58 and hence rotate it. The actuator 50 is further pivotally connected to the elongate bar member 22 at point 72.

As seen in FIG. 4, when the extension rod 51 of the actuator 50 extends from the housing 53, the cylindrical tube 58 rotates in a counterclockwise manner to a position as seen in FIG. 4. This causes the arm portion 60 to rotate and reposition the elongate bar member 22 in a longitudinally downward and latterly rearward position that is shown in FIG. 4. As shown in FIGS. 1 and 2, there are two actuators 50a and 50b. Of course, one actuator would be sufficient for the repositioning of the elongate bar member 22 in the horizontal plane; however, a number of synchronized actuators 50 could be employed.

Figure 5:
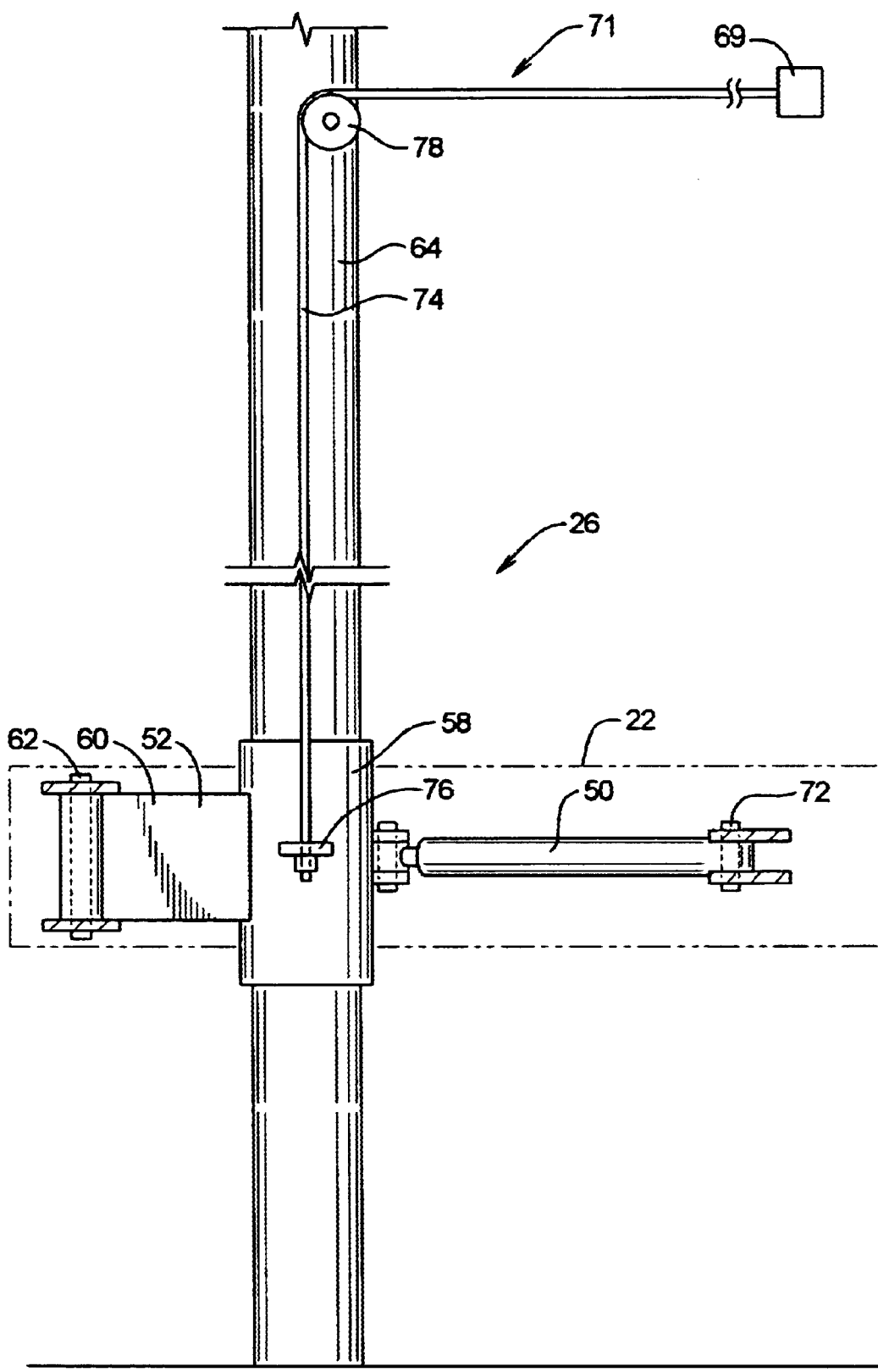
FIG. 5 is a rear horizontal view of a portion of the brisket bar assembly.
Figure 6:
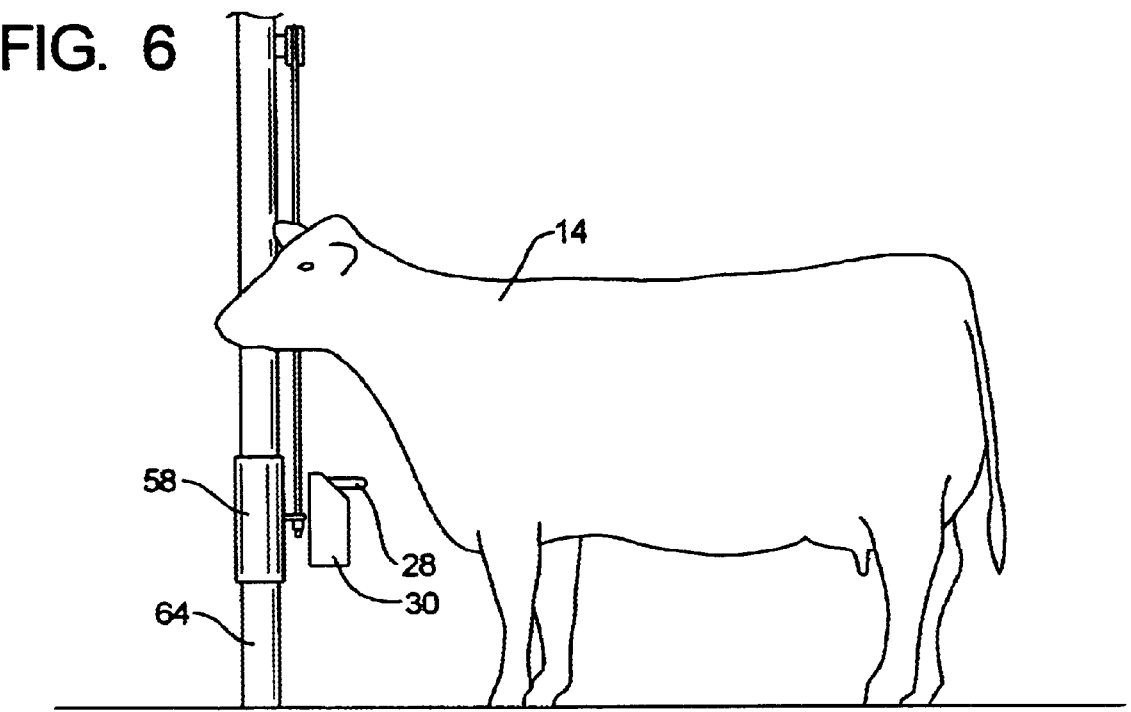
FIG. 6 is a horizontal view along the longitudinal axis showing the brisket bar assembly in a disengaged positioned.
Figure 7:
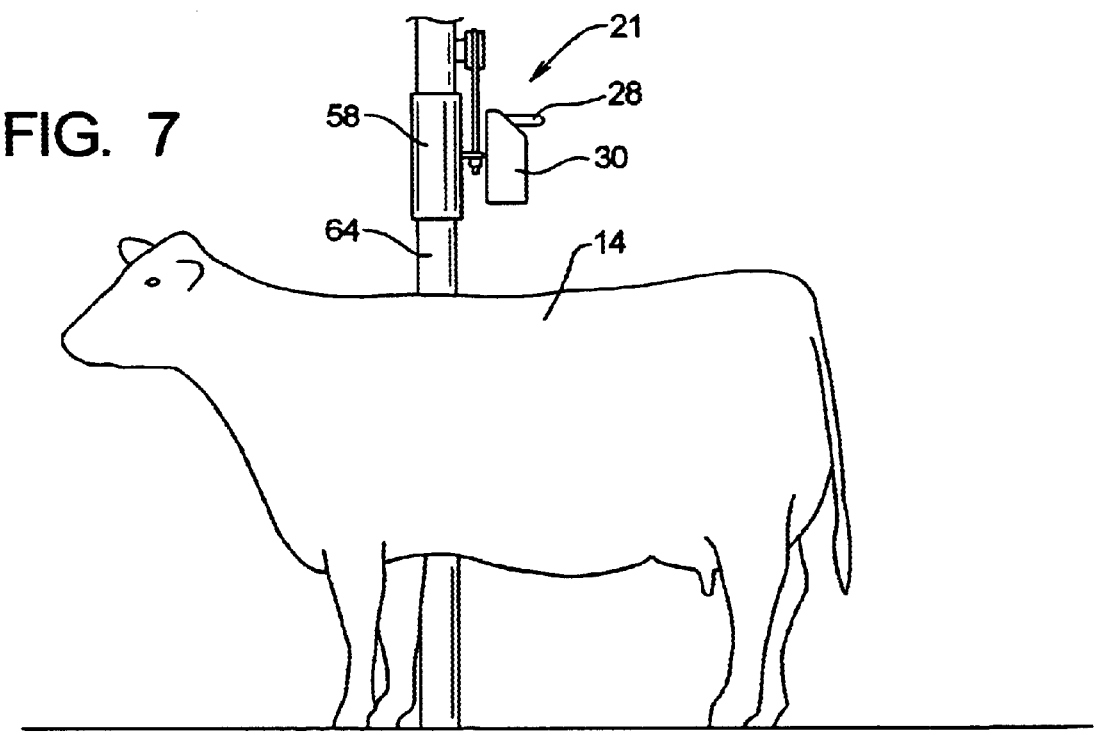
FIG. 7 is a horizontal view along the longitudinal axis showing the brisket bar in a disengaged assembly and raised at a sufficient height to allow the cow to pass thereunder.

The second actuating system 26 of the present invention is best seen in FIGS. 5–7. The purpose to the second actuating system is to raise the elongate bar member 22 to a sufficient vertical height to allow the cows can pass thereunder.

The second actuating system 26 comprises an actuator (not shown) and a lifting system 71. In the preferred embodiment, the lifting system 71 comprises the cord 74, the rigid cylindrical pole 64, and pulley 78.

As seen in FIG. 5, the rigid cylindrical pole 64 is positioned so the central longitudinal axis of the pole 64 is aligned substantially vertical. The lower portion of the rigid cylindrical pole 64 is rigidly mounted to the floor and the upper portion is likewise rigidly mounted to the ceiling of the barn or other structure. The cylindrical section 58 has an inner diameter that is slightly larger than the diameter of the rigid cylindrical pole 64. In operation the rigid cylindrical pole 64 has a thin layer of grease or equivalent lubricant that helps allow the cylindrical section 58 to slide vertically up and down the rigid cylindrical pole 64.

The cord 74 is mounted to the extension 76 which is rigidly mounted to the cylindrical section 58 and extends vertically and runs around pulley 78 and extends to the actuator 69. The cord can be made from any suitable flexible material. The actuator can be a winch of a conventional design but preferably has the capability of retracting the cord 74 at an adjustable rate and further has the capability of withdrawing the cord 74 at a controlled rate to allow a controlled decent of the brisket bar assembly 21. Of course other actuating systems can be employed where the important substantive function of the second actuating system is to vertically reposition the brisket bar assembly.

The general operations of the apparatus 20 is as follows. As seen in FIG. 1, the cows enter the stall 12 and travel longitudinally therethrough. When the first cow 14a reaches the end slot portion, she turns in a clockwise manner to an oblique position as shown in FIG. 1. Then the next cow 14b turns in a clockwise manner to a position shown in FIG. 2. When the cows 14 turned clockwise approximately thirty to sixty degrees clockwise from the longitudinal axis, their brisket engages the oblique surface 34 of the elongate member 22. Further, the left side portion of the cows' briskets also engage the rounded extension members 28.

It should be noted that when the cows enter in the stall 12 the cows are aligned longitudinally from head to tail and hence the side portions of their bodies are only expose to the substantially vertical surface 36 of the elongate member 22 (see FIGS. 9 and 11). The rounded members 28 do not come in contact with the cows 14 when they are aligned longitudinally from head to tail. This has a significant psychological impact upon the cows because their travel is not impeded when entering the stall 12. This is particularly advantageous for the cow 14a that is the first cow to enter the stall in a milking batch. When the cows turn clockwise thirty to sixty degrees to an oblique configuration, the briskets of the cows engage the oblique surface 34 of the elongate member 22.

The rounded extensions 28 act as separators to separate the cows from each other and the inner surface 29 engages the cows brisket when she is in an oblique configuration to index the cow.

When all the cows are in a pre-milking arrangement, they are then indexed and positioned into a milking position by the first actuating system 24. This is accomplished by having the milk parlor operator activate the actuator 50 where rod 51 extends which causes the elongate member 22 to reposition to a position that is shown in FIG. 2.

When the milk operator activates the actuator 50 and the elongate member 22 moves in the horizontal plane as shown in FIG. 2, the inner surface 29 of the rounded extensions indexes and positions the cows to the position shown in FIG. 2. In a milking operation it is important that the cows are properly indexed so their hindquarters are in close proximity to the jagged bar 16. At this point the milk operator places teatcups on the cows' udders and begins a milking process.

When the cows are finished milking and must exit the cow stall 12, the milking operator then utilizes the second actuating system to raise the brisket bar assembly 21. First the milk operator activates the actuator 50 so the extension rod 51 is withdrawn within the housing 53. This retracts the elongate member 22 to a retracted position that is shown in FIG. 1 and also shown in FIG. 6. The milk operator then uses a control panel (not shown) to enter in data input that activates the second actuator such as a winch assembly that is attached to the cord 74. In one form the second actuator is a winch that retracts the cord 74 so a vertical force is exerted on the extension 76 of the cylindrical members 58. This action lifts the brisket bar assembly 21 to a position shown in FIG. 7.

When the elongate member 22 is in the retracted position as seen in FIG. 6, it is still somewhat below the head at the cow. However, the cows are conditioned to reposition their head and upper neck areas to avoid the elongate member 22 as it raises vertically. When the elongate member 22 is at a sufficient height the cows that are in the stall 12 then pass thereunder and a return to the general population of post milked cows.

It should be noted that the first member 52 has a dual purpose of rotating and in the horizontal plane and repositioning the bar member 22 between an engagement position and a retracted position, and the first member 52 functions to be vertically displaced with respect to the cylindrical rigid pole 64 to reposition the brisket bar assembly 21 between a lowered position and a raised position (see FIGS. 6 and 7 respectively).

While the invention is susceptible of various modifications and alternative forms, specific embodiments thereof have been shown by way of example in the drawings and described in detail. It s should be understood, however, that it is not intended to limit the invention to the particular forms disclosed, but, on the contrary, the intention is to cover all modifications, equivalents and alternatives falling within the spirit and scope of the invention as expressed in the appended claims.

I claim:

1. A cow indexing and positioning system that is adapted to engage the brisket portion of a cow and reposition the cow, and to operate in a parlor having first and second substantially vertically extending poles rigidly attached thereto, where the cow indexing and positioning system comprises;
    a) an elongate bar that substantially extends in a longitudinal direction,
    b) a first actuating system having a first member and a second member and a first actuator wherein the components of the first actuating system comprise,
        the first member having a first cylindrical portion and a first extension portion that is rigidly attached to the first cylindrical portion wherein the first extension portion is pivotally mounted to the said elongate bar, the second member having a second cylindrical portion and a second extension portion that is rigidly attached to the second cylindrical portion wherein the second extension portion is pivotally mounted to the said elongate bar, the first actuator rotates the first cylindrical portion with respect to the substantially vertically extending poles;
    c) a second actuating system having a second actuator that is adapted to raise the elongate bar wherein the first cylindrical portion is adapted to reposition vertically upon the first substantially vertical pole, and the second cylindrical portion is adapted to reposition vertically upon the second substantially vertical pole;
    d) a rounded extension member being attached to an oblique surface of the elongate bar.

2. A cow indexing and positioning system that is adapted to engage the brisket portion of a cow and reposition the cow, and to operate in a parlor having a first and second substantially vertically extending poles rigidly attached thereto, where the cow indexing and positioning system comprises;
    a) an elongate bar that substantially extends in a longitudinal direction,
    b) a first actuating system having a first member and a second member and a first actuator where the components of the first actuating system comprise,
        the first member having a first cylindrical portion and a first extension portion that is rigidly attached to the first cylindrical portion wherein the first extension portion is pivotally mounted to the said elongate bar, the second member having a second cylindrical portion and an a second extension portion that is rigidly attached to the second cylindrical portion wherein the second extension portion is pivotally mounted to the said elongate bar,
        the first actuator rotates the first cylindrical portion with respect to the substantially vertically extending poles;
    c) a second actuating system having a second actuator that is adapted to raise the elongate bar wherein the first cylindrical portion is adapted to reposition vertically upon the first substantially vertical pole, and the second cylindrical portion is adapted to reposition vertically upon the second substantially vertical pole;
    d) the elongate bar having a substantially vertically extending surface, an oblique surface, and a plurality of rounded extension members;
    e) the substantially vertical extending surface defining a substantially vertical plane wherein the rounded extensions do not extend laterally inward to extend beyond the substantially vertical plane;
    f) the rounded extensions being attached to the oblique surface of the elongate bar.

3. A method of indexing and positioning a cow comprising the steps of:
    a) providing an elongate bar that substantially extends in a longitudinal direction, and is adapted to engage the brisket portion of a cow and reposition the cow, placing the elongate bar in a milking parlor having a first and second substantially vertically extending poles and pivotally attaching the elongate bar to first and second members that are pivotally mounted to the first and second substantially vertically extending poles respectively,
    b) repositioning the elongate bar towards the cows by rotating the first and second members about the central axes of the first and second poles respectively,
    c) repositioning the elongate bar away from the cows and raising the elongate bar about the first and second poles to allow the cows to pass thereunder.
    d) said method being characterized in that the elongate bar, the first member and the second member collectively form a four bar linkage wherein the first member has a first cylindrical portion that is adapted to engage the outer surface of the first substantially vertically extending pole to allow the first member to rotate about the first pole and to vertically displace with respect to the first pole and the second member has a second cylindrical portion that is adapted to engage the outer surface of the second substantially vertically extending pole to allow the second member to rotate about the second pole and to vertically displace with respect to the second pole.

4. A system that is adapted to engage the brisket portion of a cow and reposition the cow, and to operate in a parlor having first and second substantially vertically extending poles, where the system comprises;
    a) a brisket bar assembly comprising;
        a substantially horizontal bar member adapted to engage the brisket region of a cow,
        a first actuating system comprising a first actuator adapted to rotate first and second members pivotally attached to and adapted to rotate about the first and second substantially vertically extending poles respectively, wherein the first and second members are pivotally attached to the substantially horizontal bar member.
    b) a second actuating system adapted to raise and lower the brisket bar assembly;
    c) the first and second members being adapted to vertically reposition about the first and second poles pursuant to activation of the second actuating system and the first and second members are further adapted to rotate about the central axis of the first and second poles to reposition the substantially horizontal bar member laterally and longitudinally to engage the brisket portion of a cow and reposition the cow;

d) the elongate bar, the first member, and the second member collectively forming a four bar linkage where the first member has a first cylindrical portion that is adapted to engage the outer surface of the first substantially vertically extending pole to allow the first member to rotate about the first pole and to vertically displace with respect to the first pole and the second member has a second cylindrical portion that is adapted to engage the outer surface of the second substantially vertically extending pole to allow the second member to rotate about the second pole and to vertically displace with respect to the second pole.

5. The system as recited in claim 4, wherein;

the substantially horizontal bar has a substantially vertically extending surface, an oblique surface, and a plurality of rounded extension members, wherein the substantially vertical extending surface defines a substantially vertical plane and the rounded extensions do not extend laterally inward to extend beyond the substantially vertical plane.

6. A system that is adapted to engage the brisket portion of a cow and reposition the cow, the system being arranged to operate in a parlor having a first and second substantially vertically extending poles, where the system comprises;

a) a brisket bar assembly comprising;
 a substantially horizontal bar member adapted to engage the brisket region of a cow,
 a first actuating system comprising a first actuator adapted to rotate first and second members pivotally attached to the bar member and adapted to rotate about the first and second substantially vertically extending poles, respectively, the first and second members being pivotally attached to the substantially horizontal bar member;

b) a second actuating system adapted to raise and lower the brisket bar assembly;
 the first and second members being adapted to be vertically repositioned about the first and second poles pursuant to activation of the second actuating system and the first and second members are further adapted to rotate about the first and second poles to reposition the substantially horizontal bar member laterally and longitudinally to engage the brisket portion of a cow and reposition the cow;

c) the substantially horizontal bar member, the first member and the second member collectively forming a four bar linkage where the first member has a connecting portion that is adapted to engage the outer surface of the first substantially vertically extending pole to allow the first member to rotate about the first pole and to be vertically displaced with respect to the first pole and the second member has a connecting portion that is adapted to engage the outer surface of the second substantially vertically extending pole to allow the second member to rotate about the second pole and to be vertically displaced with respect to the second pole.

7. The system as claimed in the claim 6, wherein the second actuating system further comprises a retractable cord having a first end operatively attached to the substantially horizontal bar member and being adapted to raise the substantially horizontal bar member.

8. The system as claimed in the claim 7, wherein the cord has a second end attached to an actuator adapted to retract and withdraw the cord at a controlled rate.

9. The system as claimed in the claim 6, wherein the substantially horizontal bar member has a substantially vertically extending surface, an oblique surface, and a plurality of rounded extension members, and the substantially vertically extending surface defines a substantially vertical plane and the rounded extension members do not extend laterally inward to extend beyond the substantially vertical plane.

10. The system as claimed in the claim 6, wherein the substantially horizontal bar member has a substantially vertically extending surface, an oblique surface, and a plurality of rounded extension members, and the rounded extension members do not extend laterally inward to contact the cow body of the cow when the cow is aligned substantially longitudinal.

11. The system as recited in claim 10 wherein the rounded extension members are attached to the oblique surface of the elongate bar.

12. The system as recited in claim 6 wherein the substantially horizontal bar member has an oblique contact surface and the substantially horizontal bar member has a disengaged position where the oblique contact surface is away from the brisket region of the cow and the substantially horizontal bar member further has an engaged position where the oblique contact surface is in closer proximity to the brisket region of the cow than in the disengaged position.

13. The system as recited in claim 6, wherein the first and second members have cylindrical portions that intimately engage the outer surface of the substantially vertical poles.

* * * * *